(12) United States Patent
Wei et al.

(10) Patent No.: US 10,507,882 B2
(45) Date of Patent: Dec. 17, 2019

(54) VEHICLE SUSPENSION DEVICE

(71) Applicant: Gaius Automotive, Inc., Taichung (TW)

(72) Inventors: Yi-Pin Wei, Taichung (TW); Christian Janse, Taichung (TW)

( * ) Notice: Subject to any disclaimer, the term of this patent is extended or adjusted under 35 U.S.C. 154(b) by 102 days.

(21) Appl. No.: 15/748,188

(22) PCT Filed: Jul. 28, 2016

(86) PCT No.: PCT/US2016/044597
§ 371 (c)(1),
(2) Date: Jan. 28, 2018

(87) PCT Pub. No.: WO2017/019920
PCT Pub. Date: Feb. 2, 2017

(65) Prior Publication Data
US 2018/0222545 A1    Aug. 9, 2018

Related U.S. Application Data

(60) Provisional application No. 62/198,122, filed on Jul. 28, 2015.

(51) Int. Cl.
*B62K 5/10* (2013.01)
*B62K 5/027* (2013.01)
(Continued)

(52) U.S. Cl.
CPC ............. *B62K 5/10* (2013.01); *B62K 5/027* (2013.01); *B62K 7/04* (2013.01); *B62K 25/04* (2013.01);
(Continued)

(58) Field of Classification Search
CPC . B62K 5/10; B62K 25/04; B62K 7/04; B62K 5/027; B62K 2025/048; B62K 2025/044; B62K 2207/02
See application file for complete search history.

(56) References Cited

U.S. PATENT DOCUMENTS

| | | | |
|---|---|---|---|
| 2008/0100018 A1* | 5/2008 | Dieziger | B60G 3/20 280/124.103 |
| 2009/0020352 A1* | 1/2009 | Horii | B62K 5/027 180/212 |

(Continued)

*Primary Examiner* — Drew J Brown
(74) *Attorney, Agent, or Firm* — Opes IP Consulting Co. Ltd.

(57) ABSTRACT

The present disclosure relates to a suspension system (200) that is installed on a vehicle and is capable of performing functions including park locking, returning momentum, tilt limiting and rear suspension. The suspension system (200) comprises a rear suspension mounting structure (302), a rear suspension swing arm (306), a tilt limiting structure (201), and a tilt restoring structure (202). The rear suspension swing arm (306) is pivotally coupled to the rear suspension mounting structure (302) and configured to rotate about the rear suspension mounting structure (302) in response to a tilting movement of the vehicle. The tilt limiting structure (201) is configured to mechanically inhibit the tilting movement when a tilt angle of the vehicle exceeds an instantly-calculated tilt angle value. The tilt restoring structure (202) is configured to apply a force in response to the tilting movement.

15 Claims, 9 Drawing Sheets

(51) Int. Cl.
*B62K 7/04* (2006.01)
*B62K 25/04* (2006.01)
(52) U.S. Cl.
CPC .. *B62K 2025/044* (2013.01); *B62K 2025/048* (2013.01); *B62K 2207/02* (2013.01)

(56) References Cited

U.S. PATENT DOCUMENTS

| | | | |
|---|---|---|---|
| 2010/0032914 A1* | 2/2010 | Hara | B60G 13/08 280/5.509 |
| 2012/0259491 A1* | 10/2012 | Kurakawa | B60K 1/04 701/22 |
| 2014/0129086 A1* | 5/2014 | Takenaka | B62D 6/003 701/41 |
| 2015/0158360 A1* | 6/2015 | Uebayashi | B60G 3/26 280/5.508 |
| 2018/0281888 A1* | 10/2018 | Chang | B62K 25/08 |
| 2019/0106174 A1* | 4/2019 | Brudeli | B62D 9/02 |

* cited by examiner

VEHICLE SUSPENSION DEVICE

CROSS-REFERENCE TO RELATED APPLICATION(S)

The present application claims priority to U.S. Provisional Application Ser. No. 62/198,122 filed on Jul. 28, 2015, which is hereby incorporated by reference of its entirety.

FIELD

This disclosure relates to a vehicle suspension device, particularly to a suspension system controlling the tilting movement of a vehicle having a minimum of three wheels.

BACKGROUND

A tilting, or leaning, vehicle has generally three or four wheels, and its body is able to tilt, or lean, into the direction of a turn. This feature allows tilting or leaning vehicles to corner safely and with stability, despite having a narrow track and a high center of gravity. Single track vehicles such as motorcycles and bicycles are not called tilting vehicles, and having only two wheels does not allow their leaning to be controlled by a suspension device (other than gyroscopic systems).

Several configurations for a tilting vehicle are possible such as two front wheels and one rear wheel, one front wheel and two rear wheels, or four wheels. More than four wheels would be possible but not practical.

Generally, the rider is responsible for balancing the vehicle primarily through steering and counter-steering inputs.

To assist the rider in controlling the vehicle, suspension systems (tilt control systems) are employed, and the systems can either be passive or active. Passive systems are limited in that it involves providing a returning momentum that helps the vehicle to recover from a tilt (or lean), and a centering momentum that helps keep the vehicle from falling over when stationary. Active systems are able to control and/or assist the dynamic movement of the vehicle depending on the rider steering inputs. Passive systems currently lack the technology required to account for a wide range of operating conditions, especially when vehicle cargo loading changes. On the other hand, fully active systems suffer from high costs and complexity.

SUMMARY

This disclosure describes a passive, reactive suspension control system that surpasses prior art systems in its adaptability to different operating conditions of the vehicle. In an alternate embodiment, an electronic control system is added to create a semi-active dynamic rider assist behavior.

The dynamics of a tilting vehicle are greatly affected by its weight, and the height of the vehicle's center of gravity. Both factors experience large variations depending on passenger and cargo loading (the payload) of the vehicle, because the payload can be greater than the unloaded weight of the vehicle itself. It is therefore an aim of this disclosure to change the behavior of the suspension system depending on the vehicle's cargo loading.

A system for the control of the vehicle's tilting motion is presented, which works in conjunction with a rear suspension system that allows a designed ride height to be maintained independent of the vehicle's cargo loading.

LISTING OF ELEMENTS

| | |
|---|---|
| 100 | Vehicle |
| 200 | Suspension System |
| 201 | Tilt control system |
| 202 | Rear suspension module |
| 203 | Cargo bed |
| 301 | Tilt control module |
| 302 | Rear suspension mounting structure |
| 303 | Load reaction piston |
| 304 | Damper |
| 305 | Rear suspension rocker assembly |
| 306 | Rear swingarm assembly |
| 307 | Rear suspension rocker pivot axis member |
| 308 | Park lock lever |
| 309, 310 | Actuation point |
| 401a, 401b | Pullrod |
| 402 | Leveling valve |
| 403 | Actuator |
| 502a, 502b | Front bushing |
| 503 | Input Shaft |
| 506 | Accumulator |
| 507 | Collector |
| 508 | Reservoir |
| 600 | Hydraulic circuit |
| 601, 602 | Tilt piston |
| 604 | Variable pressure compensator valve |
| 606 | Filter element |
| 607 | Park lock shutoff valve |
| 609 | Mechanical return spring |
| 610, 611 | Park lock overload check valve |
| 612, 613 | Damping orifice valve |
| 614, 615 | Spring loaded check valve |
| 616 | Return check valve |
| 617 | Load reaction shutoff valve |
| 618 | Two-pressure valve |
| 619 | Returning spring |
| 626 | Tilt-controlled shuttle valve |

DETAILED DESCRIPTION

The suspension system of a tilting vehicle can be divided into front and rear sections. The front section supports portions of the vehicle weight distributing to it. It also steers the vehicle and leans together with the chassis of the vehicle (1F1T or 1F3T: 1 front wheel and one or three tilting wheels according to tilting vehicle designation convention—1F2T would be a two-wheel motorcycle). It is also possible for the front section to have two wheels steering and leaning (2F2T, 2F3T or 2F4T). The rear section consists of one wheel leaning together with the chassis (1F2T or 2F3T), or two wheels tilting in relation to it and the ground (1F3T and 2F4T), or the two rear wheels not tilting with respect to the ground but tilting in relation to the chassis (1F1T or 2F2T).

Figure 1:
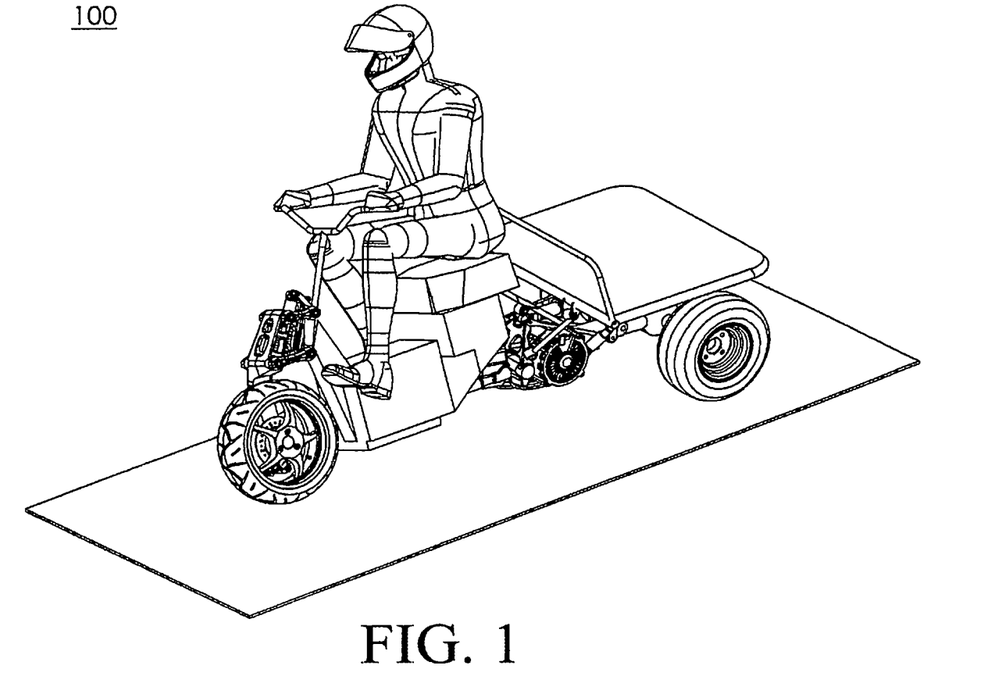
FIG. 1 shows a front corner view of a three-wheel tilting vehicle.
Figure 2:
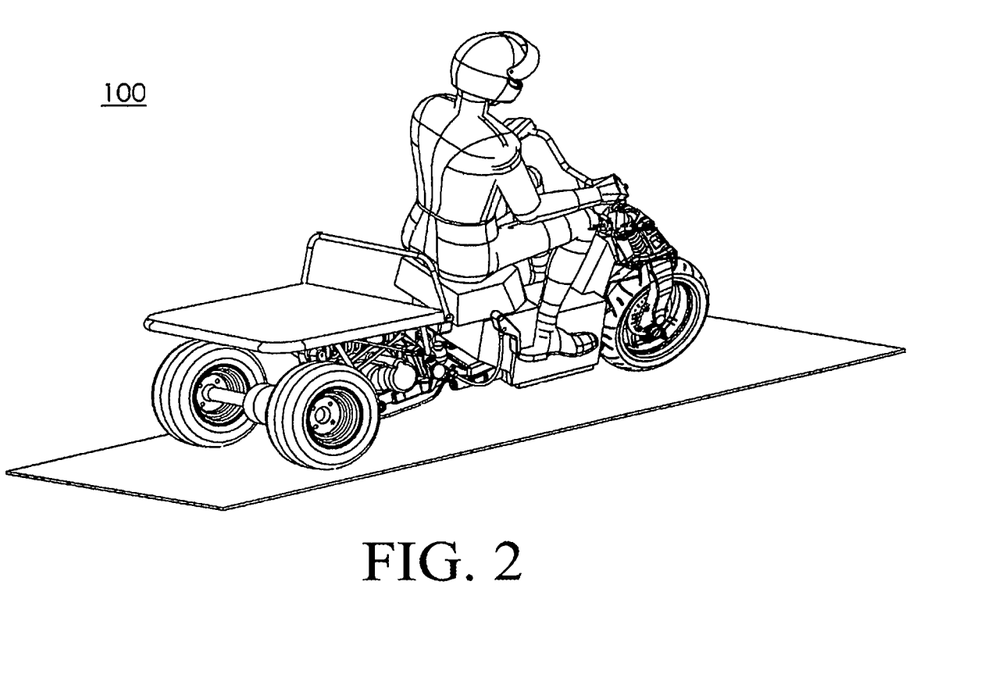
FIG. 2 shows a rear corner view of a three-wheel tilting vehicle.

From this point onwards, descriptions and explanations will be related to a vehicle 100 that has one front and two rear wheels. The front wheel tilts with respect to the ground, and the rear wheels tilt with respect to the vehicle 100 as a single unit. But the front wheel and the rear wheels do not tilt with respect to the ground (1F1T: one front wheel, one tilting wheel), as shown in FIG. 1 and FIG. 2. It should be appreciated that the disclosure can be equally applied to vehicles with different suspension arrangements and having a fixed tilting axis, as would be obvious to those skilled in the art.

For the vehicle 100 described herein, the rear suspension consists of a solid axle linking the two rear wheels to an assembly that is pivotally connected to a suspension carrier member, which is pivotally connected to the chassis through a tilt control mechanism. The rear suspension supports and controls the weight of the rear end of the vehicle 100. The tilt control mechanism controls the rotational movement of the rear suspension with respect to the chassis.

There are other functions of a tilting mechanism such as suspension geometry effects. For example, control over vehicle roll center, relative steer angle between front and rear wheels, anti-lift, anti-squat etc. But they are outside of the scope of this disclosure.

The functional requirements of the suspension device are as follows:

Park Locking.

Refers to the ability to inhibit the tilting movement of the vehicle 100 when stopped or parked. With the park locking system engaged, the vehicle 100 cannot be tilted or leaned; one of the rear wheels of the vehicle would have to be lifted off the ground in order to tilt or lean.

Returning Momentum.

This function helps maintaining the vehicle 100 upright when stationary and when park lock is disengaged. The centering function is active from the extremes of the vehicle 100's tilting and helps the rider control the overturning momentum generated by the weight of the vehicle 100 and its cargo load. The returning momentum has to be high enough to offer meaningful assistance to the rider, but not so high as to create a noticeable impediment to movement as the vehicle 100 transitions from left lean to right lean. The noticeable impediment could unsettle the balance of the vehicle 100 and force the rider to compensate with control inputs, and thus negatively impact riding safety.

Tilt Limiting.

When the tilt angle of the vehicle 100 reaches a predetermined limit, the system restricts further tilt movement. This is necessary to keep the vehicle 100's body and chassis from hitting the ground while cornering. Such contact would create a sharp change in vehicle behavior and balance and could result in loss of control by the rider.

Rear Suspension.

The rear suspension controls the rear wheels of the vehicle 100 using a spring and a damper, which is typically attached to a movable swingarm.

Figure 3:
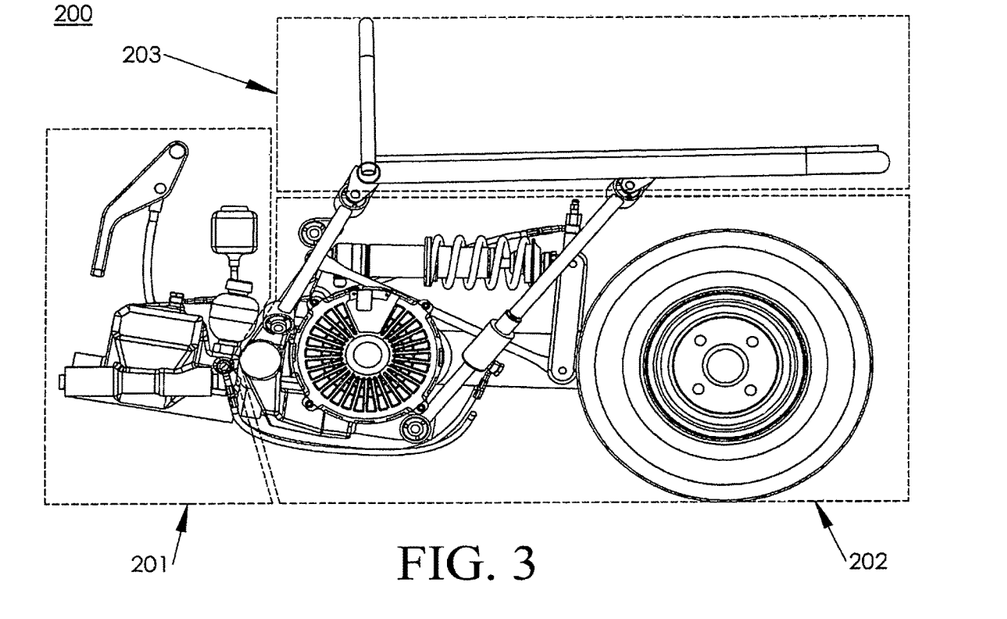
FIG. 3 illustrates components of the suspension system in certain embodiments.
Figure 4:
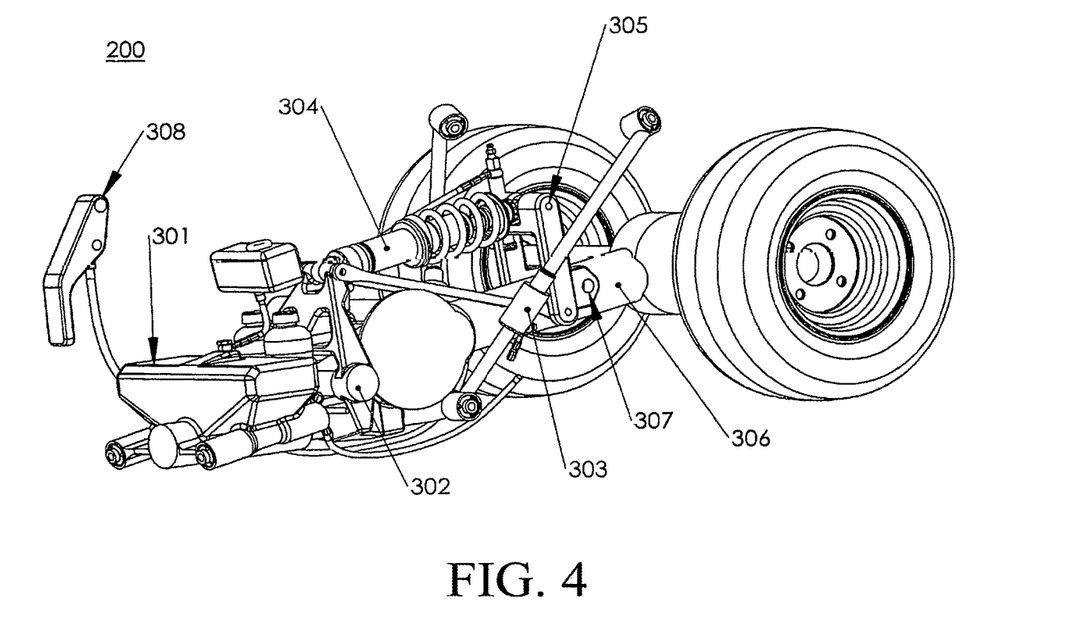
FIG. 4 is a detail illustration of key components of the suspension system shown in FIG. 3.

The present disclosure applies hydraulic and mechanical control to satisfy the functional requirements of a rear suspension system. The overall suspension system 200 consists of three main sections as shown in FIG. 3, i.e., the tilt control system 201 for tilt limiting (tilt limiting structure), the rear suspension module 202 for tilt restoring (tilt restoring structure), and the cargo load supporting tray (cargo bed) 203. FIG. 4 identifies the key components of the overall suspension system 200: a tilt control module 301, a rear suspension mounting structure 302, at least one load reaction piston 303, a damper 304 that may be a spring in some embodiments, a rear suspension rocker assembly 305, a rear swingarm assembly 306, a rear suspension rocker pivot axis member 307, and a park lock lever 308.

Figure 5:
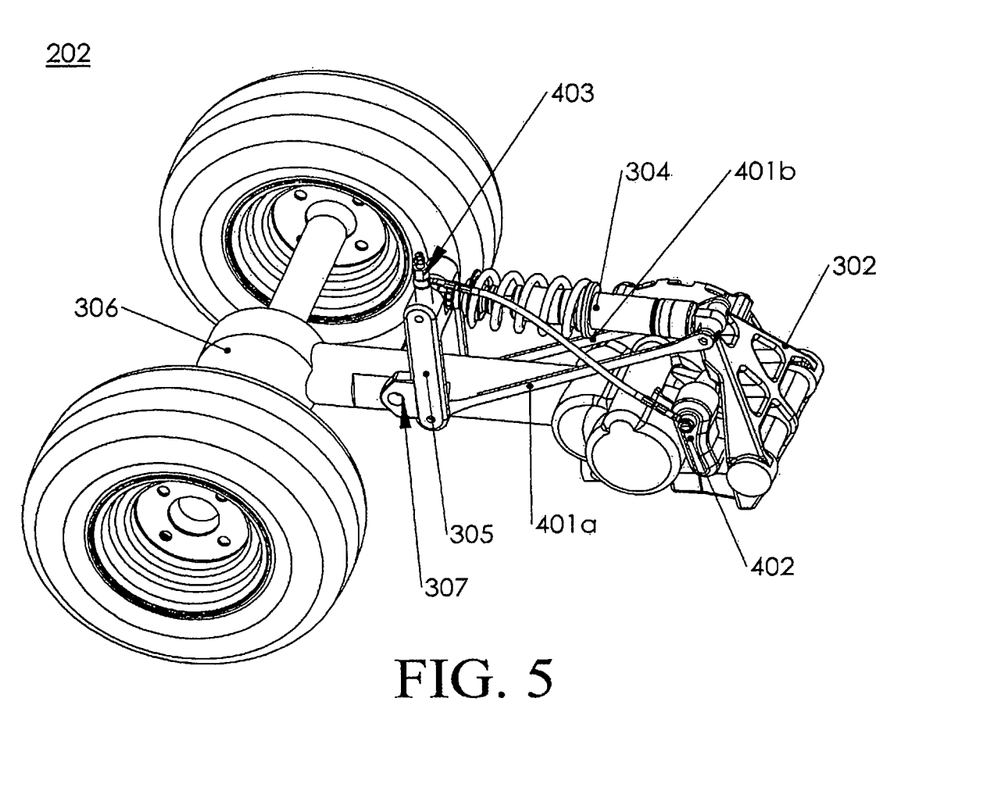
FIG. 5, FIG. 6, FIG. 7, and FIG. 8 illustrate some embodiments of the rear suspension module.

The rear suspension module 202 is shown in FIG. 5, and consists of the rear suspension mounting structure 302, the damper 304, the rear suspension rocker assembly 305, the rear suspension swingarm assembly 306, pullrods 401a and 401b, and a leveling valve 402. The rear suspension rocker assembly 305 is pivotally connected to the vehicle 100's rear suspension swingarm assembly 306, and incorporates an actuator 403. One end of the pullrods 401a or 401b is pivotally connected to the rear suspension rocker assembly 305, and the other end is connected to the suspension carrier member.

The position of the rear suspension rocker assembly 305 relative to the rear suspension rocker pivot axis member 307 of the rear suspension swingarm assembly 306 can be adjusted through the actuator 403. Note that in some embodiments, the rear suspension pivot axis member 307 is a protruding element disposed in a hole, as shown in FIG. 5. The protruding feature of the rear suspension pivot axis member 307 is not illustrated herein for the drawing's clarity. The actuator 403 is preferably a linear hydraulic actuator, but can also be a rotary hydraulic actuator.

Figure 6:
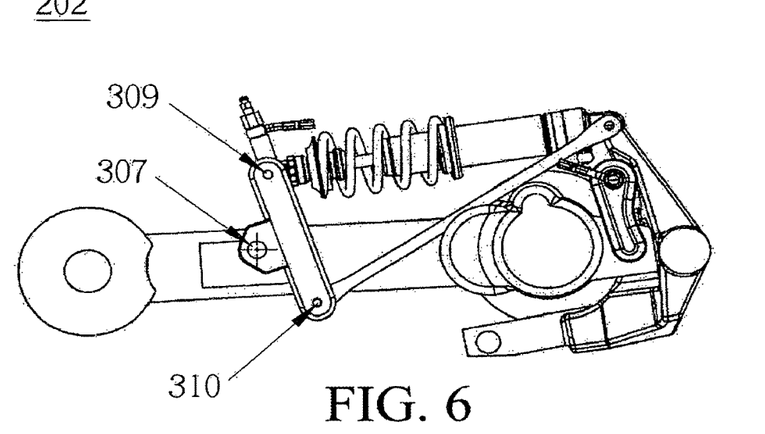
Figure 7:
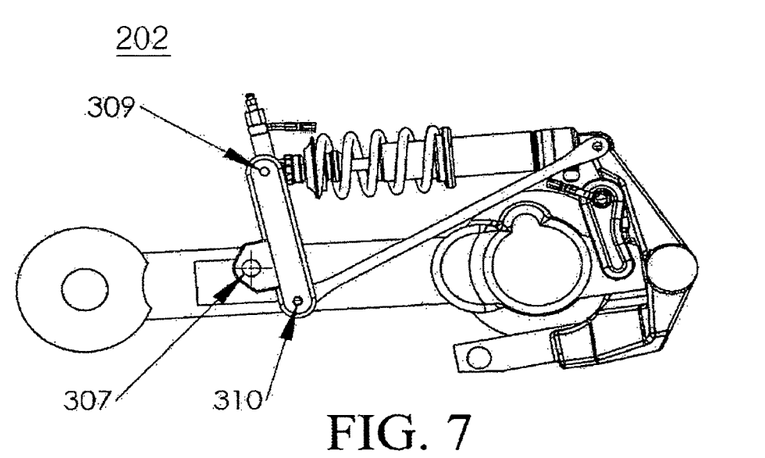
Figure 8:
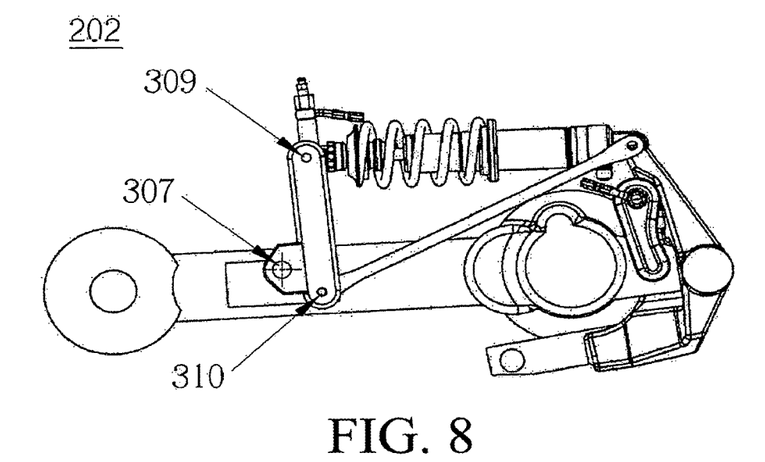

The position of this actuator 403 controls the motion ratio of the suspension system 200. In other words, by changing the position of the pullrods 401a and 401b and the damper 304 with respect to the axis of rotation defined by the rear suspension rocker pivot axis member 307, the load of the vehicle 100 transmitted to the damper 304 can change. The maximal position of the rear suspension rocker assembly 305 is shown in FIG. 6. The normal position is shown in FIG. 7 and FIG. 8 shows the minimal position of the rear suspension rocker assembly 305. As the pullrod actuation point 310 moves closer to the axis of rotation defined by the rear suspension rocker pivot axis member 307, the actuation point of the spring/damper 309 moves further away from the rear suspension rocker assembly 305's axis of rotation. Consequently, a greater portion of the vehicle 100's weight is transmitted by the pullrods 401a and 401b to the chassis, and more energy stored in the damper 304 can be used to support the increased load of the vehicle 100. Therefore, by adjusting the relative location of the actuation points, the system can react to the increase of payload without creating rear suspension deflection. The rear suspension deflection is defined by wheel travel relative to the chassis, and it would cause the pitching of the vehicle 100 at about its front wheel. This allows the vehicle 100 to keep operating in its optimal design altitude, and maintains a predefined amount of suspension travel.

For more details of the above paragraph, the rear suspension rocker pivot axis member 307 is the pivot that the rear suspension rocker assembly 305 rotates about. And it is fixed into the rear suspension rocker assembly 305 as shown in FIG. 5. Therefore, the rear suspension rocker assembly 305 can move up and down with respect to a block (not shown) that the rear suspension rocker pivot axis member 307 is installed into.

As the rear suspension swingarm assembly 306 rotates clockwise in FIG. 5 when the vehicle 100 hits a bump, the entire rear suspension rocker assembly 305 moves with a cylindrical portion of the rear suspension mounting structure 302. It is because the rear suspension rocker assembly 305 is connected to the rear suspension mounting structure 302 with a pivot axle, i.e. the hole in the rear suspension rocker pivot axis member 307.

As shown in FIG. 5, the pullrods 401*a* and 401*b* are rotatably bolted to the non-movable rear suspension mounting structure 302 that is concentrically coupled to the damper 304's mounting using the same or a separate bolt. The pullrods 401*a* and 401*b* are also rotatably mounted to the rear suspension rocker assembly 305. As the rear wheels of the vehicle 100 move up and the rear swingarm assembly 306 rotates clockwise in response, the pullrods 401*a* and 401*b* force the rear suspension rocker assembly 305 to rotate clockwise for compressing the damper 304. That is, the pullrods 401*a* and 401*b* drive the rear suspension rocker assembly 305 upwards in view of FIGS. 5-8.

The pullrods 401*a* and 401*b* are connected to a mounting bracket of the rear suspension mounting structure 302 that can rotate with respect to the chassis. The rear swingarm assembly 306 pivots in this mounting bracket. As shown in FIG. 3, the tilt control system 201 may be a hydraulic control center, and an input shaft connected to the rear swingarm assembly 306 rotates inside the tilt control system 201. Therefore, the rear swingarm assembly 306 can rotate with respect to the chassis, and the rear suspension module 202 and the cargo bed 203 may both rotate about the axis defined in the tilt control system 201.

Figure 13:
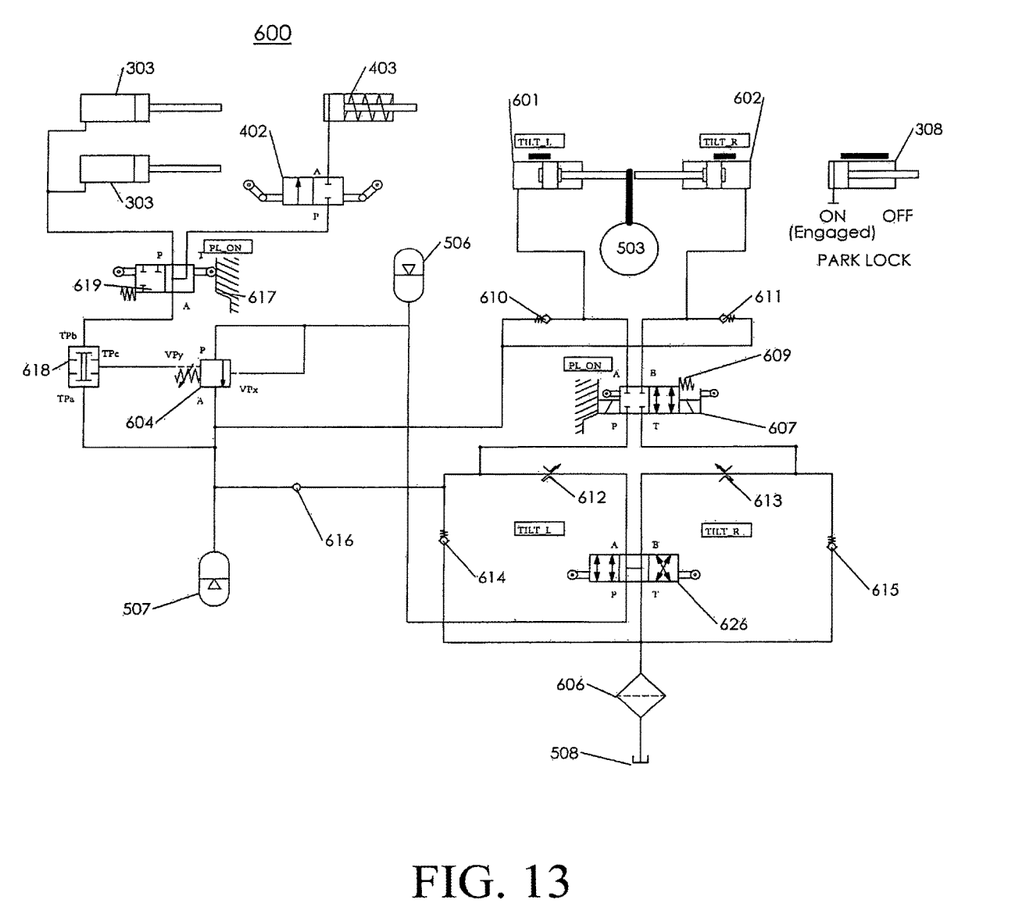

The actuator 403 that may be a hydraulic actuator is controlled by the leveling valve 402. The leveling valve 402 closes off the connection between the load reaction pistons 303 and the actuator 403 when the vehicle 100 is at its design (normal) position (as shown in FIG. 7). When the vehicle 100 is at the design position, that means the rear suspension module 202 is in equibrilium, and no more adjustment is required this time. When a load is added to the cargo bed 203, the suspension compresses and the rear suspension swingarm assembly 306 rotates with respect to the rear suspension mounting structure 302. The rotation of the rear suspension swingarm assembly 306 triggers the leveling valve 402 to direct hydraulic fluid to the actuator 403. Then the actuator 403 shifts the rear suspension rocker assembly 305 with respect to the rear suspension rocker pivot axis member 307 between the minimal and maximal positions as shown in FIG. 6 and FIG. 8, respectively. Because the motion ratio changes, the force exerted by the damper 304 on the rear suspension swingarm assembly 306 increases, and the rear suspension swingarm assembly 306 rotates back towards its normal (design) position shown in FIG. 7. When the suspension returned to the design position, the leveling valve 402 closes. This adjustment is only allowed to happen when the park lock of the vehicle 100 is engaged with the park lock lever 308, i.e., when the vehicle 100 is not in motion. Therefore, once the vehicle 100 is in motion, no further adjustment can be made to the mechanism. The present embodiment uses a load reaction shutoff valve 617, coupled to (e.g. mechanically) and controlled by the park lock lever 308 to achieve this lockout of the spool valve, as indicated in FIG. 13 when the park lock is engaged with the park lock lever 308. In an alternate embodiment, the leveling valve 402 can be, e.g. mechanically, disconnected from the rear swingarm assembly 306 when the park lock is disengaged from the park lock lever 308, i.e. when the vehicle 100 is not in motion. In addition to operations of the leveling valve 402, hydraulic circuits inside the rear suspension module 202 are locked when the park lock is disengaged from the park lock lever 308. Therefore, the leveling operation can only occur when the vehicle 100 is not in motion, i.e. when the vehicle 100 is in its parking position with its brakes and tilting mechanism locked. With the aid of the leveling valve 402, hydraulics inside the rear suspension module 202 would not constantly adjust the rear suspension rocker assembly 305 due to bumps on the road when the vehicle 100 is in motion.

Figure 9:
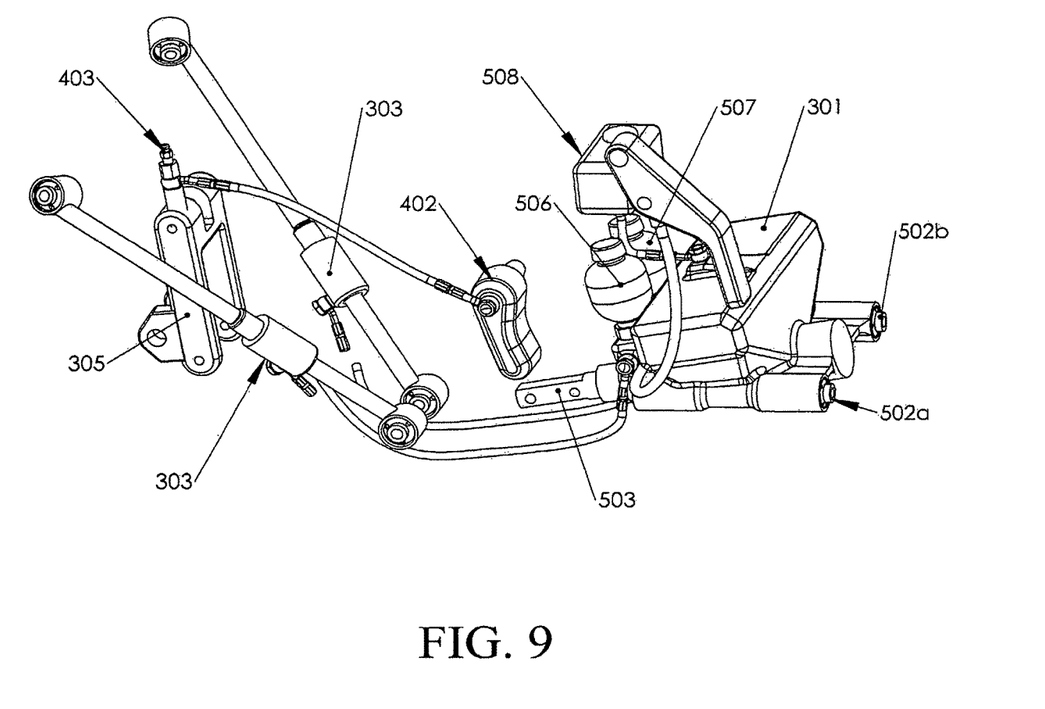
FIG. 9 is a schematic of the tilt control module in certain embodiments.

A tilt control mechanism including the tilt control module 301 is shown in FIG. 9. The housing of the tilt control module 301 is connected to the chassis through two front bushings 502*a*, 502*b*, and two rear bushings 502*c* and 502*d* (not visible). The module's input shaft 503 is, e.g. rigidly, connected to the rear suspension mounting structure 302, and thereby controls the tilting of the vehicle 100.

The input shaft 503 rotates when the vehicle 100 tilts or leans. Tilting occurs when a rider creates a change of load of the vehicle 100 by cornering, or when maintaining an upright vertical attitude on a slope. So if the vehicle 100 is on a banked road, or if one wheel (e.g. the left wheel) is on the road and the other wheel (e.g. the right wheel) is on the curb, in order to be vertical with respect to the direction of the force of gravity, the vehicle 100 has to rotate to create rotation of the input shaft 503. Also, if one wheel (e.g. the left wheel) hits a bump, but the other wheel (e.g. the right wheel) does not hit a bump, there will be a rotation of the input shaft 503 partially inside the tilt control module 301.

The system comprises one or more hydraulic actuator cylinders (load reaction pistons/actuators) 303 attached to the cargo bed 203 of the vehicle 100. In the described embodiment two of such cylinders are used. Alternatively, the cylinder or cylinders can be attached to a frame that holds the rider and the passengers and/or cargo. In this case, the system compensates for the weight of the rider and passengers in addition to the cargo load on the cargo bed 203. The purpose of the load reaction pistons 303 is to react to the load placed on the vehicle 100's cargo bed 203. The load reaction pistons 303 pump hydraulic fluid that moves the actuator 403 to level the rear suspension rocker assembly 305 and the cargo bed 203 to their design positions. And the load reaction pistons 303 also modify the tilt assist force for leveling the rear suspension rocker assembly 305 and the cargo bed 203 through a hydraulic circuit 600.

Note that the load reaction pistons 303 do not react to the tilting of the vehicle 100. They are disposed between the cargo bed 203 and the rear suspension module 202, so they are compressed only due to a change of load on the cargo bed 203, e.g., an increase of the load. Compression of the load reaction pistons 303 is used as a control input to change the restoring/returning force generated by the tilt control system 201.

Also shown in FIG. 9, there are the accumulator 506, the collector 507, the reservoir 508, and the rear suspension module 202's leveling valve 402, the rear suspension rocker assembly 305 and the actuator/actuating cylinder 403. The accumulator 506, the collector 507, and the reservoir 508 may also be hydraulic.

Figure 10:
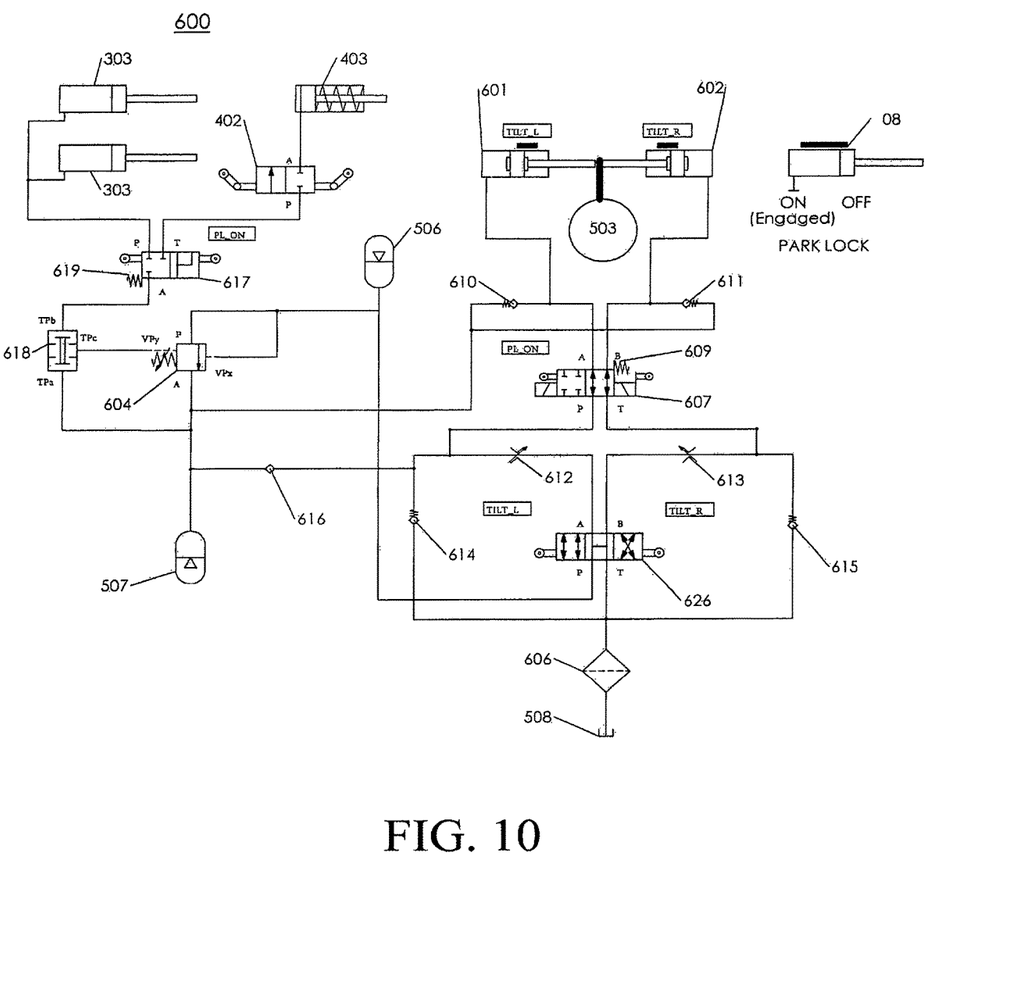
FIG. 10, FIG. 11, FIG. 12, and FIG. 13 illustrate a hydraulic diagram of the tilt control module shown in FIG. 9 about operations of the tilt control module according to some embodiments.
Figure 11:
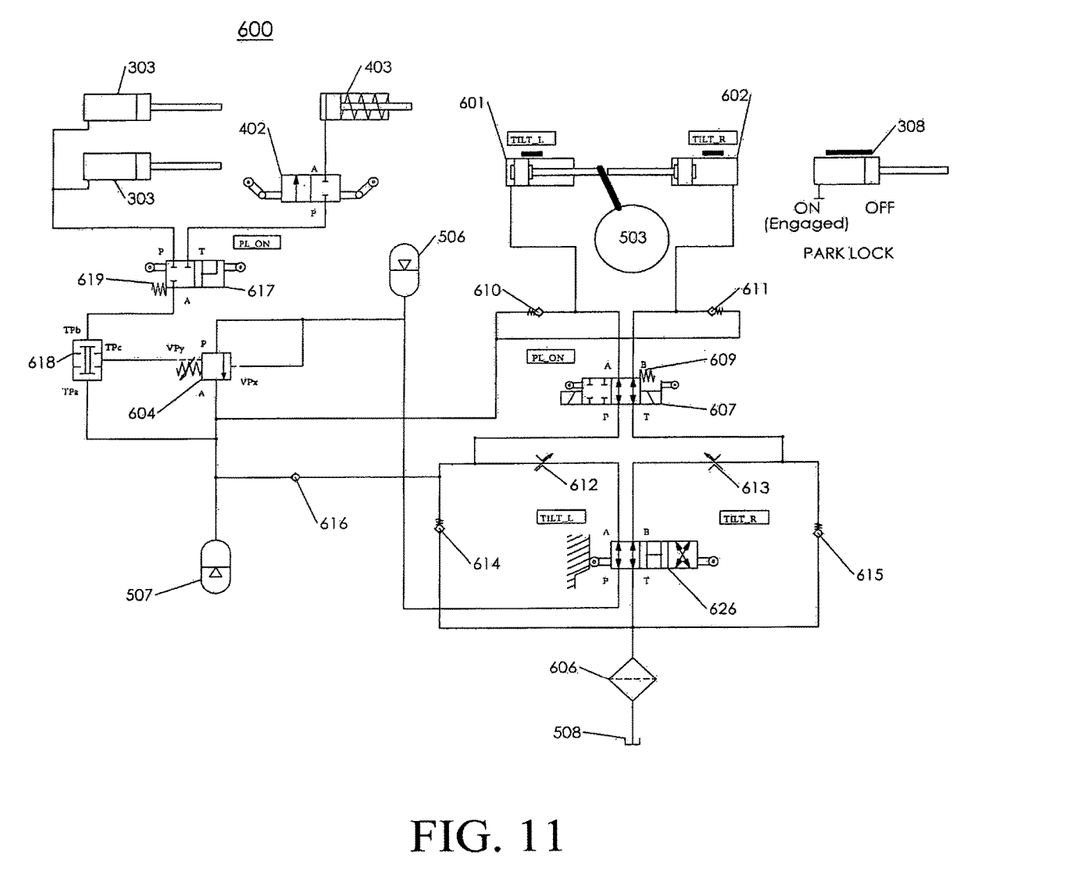
Figure 12:
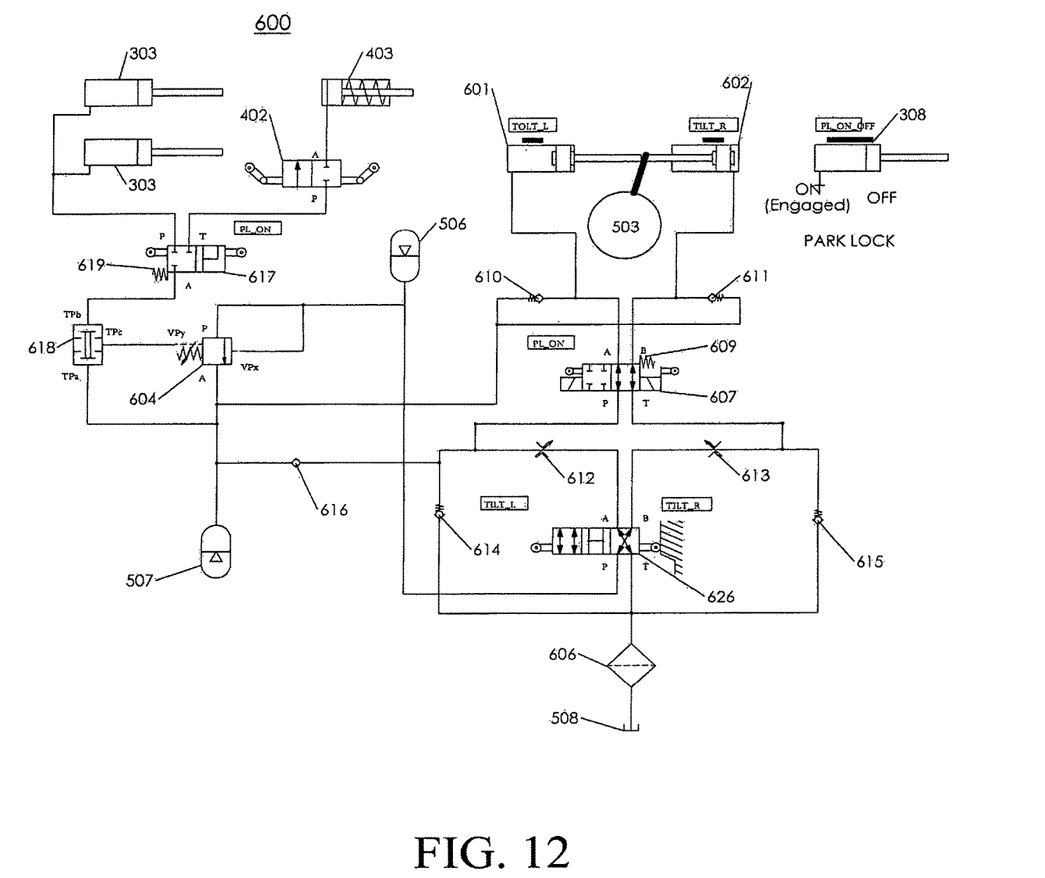

The hydraulic circuit 600 of the tilt control system is presented in FIG. 10, FIG. 11, FIG. 12, and FIG. 13. FIG. 10, FIG. 11, and FIG. 12 correspond to a condition that the vehicle 100 is not in motion, i.e., parked. And FIG. 13 corresponds to a condition that the vehicle 100 is in motion, i.e., not parked. When the vehicle 100 is not in motion, the park lock lever 308 is disengaged from the park lock of the vehicle 100, as the switch block inside the park lock lever 308 shown in FIG. 10, FIG. 11, and FIG. 12 is located at the "OFF" position. Similarly, when the vehicle 100 is in motion, the park lock lever 308 is engaged with the park lock of the vehicle 100, as the block inside the park lock lever 308 shown in FIG. 13 is located at the "ON" position.

As shown in FIG. 10, the system contains two single acting hydraulic actuators (tilt pistons/cylinders, and will annotate as tilt pistons hereafter) 601 and 602 connected to the input shaft 503. The tilt pistons 601 and 602 displace hydraulic fluid in reaction to the rotation of the rear suspension module 202 about a tilt axis. The tilt axis is defined by the axis of rotation of the tilt mechanism. And the tilt mechanism itself is coaxial with the axis of the input shaft 503. The rotation of the rear suspension module 202 is a result of the tilting of the vehicle 100. Examples of other types of hydraulic actuators (i.e. the tilt pistons 601 and 602) that could be used instead of hydraulic cylinders include single- or multiple-vane rotary pumps, gear pumps, double-acting hydraulic cylinders and any other device that convert the input shaft's rotary motion into fluid displacement. The present disclosure could equally make use of either of these elements. There are three reasons that two hydraulic tilt pistons are used in this preferred embodiment of the disclosure. First, this arrangement allows operating the tilt pistons 601 and 602 with levers while maintaining force output symmetry between clockwise and counterclockwise rotation. Second, overlapping the tilt pistons 601 and 602 allows a reduced the overall width of the device, which is important on a motorcycle that offers limited packaging space. Third, cylindrical hydraulic actuators are easiest to seal without leakage, and also less costly to produce.

The tilt pistons 601 and 602 are connected to hydraulic accumulators 506 and 507 through internal fluid passages (galleries) formed in the tilt control system 201's housing. The purpose of the accumulators 506 and 507 is to act as energy storage devices. The accumulator 506 is always connected to the main fluid circuit, and the other accumulator (hereafter "collector" 507) is controlled through a variable pressure compensator valve 604, and serves to collect hydraulic fluid. More specifically, the variable pressure compensator 604 is configured to release some pressure from the accumulator 506 to the collector 507, thereby introducing a smaller tilt assisting force when little or no load is placed on the cargo bed 203. However, when the cargo bed 203 is fully loaded, the entire energy stored in the accumulator 506 is used to assist the rider to return the vehicle to an upright position.

Both the accumulator 506 and the collector 507 contain a chamber filled with gas, and another chamber that the hydraulic fluid can be pumped into. The gas volume of the accumulator 506 and the collector 507 is pre-charged with sufficient pressure for generating necessary system hydraulic pressure.

The main fluid circuit connected to the accumulator 506 is the source of pressure. The main fluid circuit develops pressure when it is pumped into hydraulic fluid by the tilt pistons 601 and 602. The hydraulic fluid is normally stored in the reservoir 508. When the rear suspension rocker assembly 305 and the hydraulic system is at the design position, the reservoir 508 is connected to the hydraulic circuit 600. Therefore, if there is any leakage in the hydraulic system, the reservoir 508 can help refill. Otherwise, the fluid may leak out, and the hydraulic system may lose its functionality. In some embodiments, the reservoir 508 is required to be at the location of a highest height, so that any air bubble within the hydraulic system can make their way up and out through the reservoir 508.

When the vehicle 100 tilts toward the left side as illustrated by FIG. 11, a tilt-controlled shuttle valve 626 connected between the tilt control module 301 and the input shaft 503 directs hydraulic fluid to the working chamber of the left tilt piston 601. And the tilt-controlled shuttle valve 626 vents the hydraulic fluid from its non-working chamber to the reservoir SUB. The behavior is reversed when the vehicle 100 is tilting towards the right side, as shown by FIG. 12.

Note that the tilt-controlled shuttle valve 626 is disposed inside the tilt control module 301, and its connection between the tilt control module 301 and the input shaft 503 is not substantially illustrated in the Figures for clarity. Also note that the path of the tilt-controlled shuttle valve 626 to direct and vent hydraulic fluid is not illustrated in any Figure for clarity. The non-working chamber is the one that the piston rod between the tilt pistons 601 and 602 passes through. The purpose is that if there is any leakage past the piston seals from the working chamber (i.e. the one under pressure and connected to the hydraulic circuit 600) to the non-working chamber, the hydraulic fluid stays in the overall hydraulic system including the reservoir 508, so that there will be no loss of fluid.

When the tilt pistons 601 and 602 are in the design/neutral position (the vehicle 100 has no rotation with respect to the rear suspension), the oil volume contained in the tilt pistons 601 and 602 is connected to the oil reservoir 508 through a filter element 606. In this way, if there is any leakage in the system, the leakage will self-compensate and "reset" itself every time when the leakage passes through the design/neutral position.

The fluid displaced by the tilt pistons 601 and 602 passes through the park lock shutoff valve 607, which is both electrically and mechanically actuated. Electric actuation is desirable so that the vehicle 100's controller (e.g. an engine control unit, ECU) can prevent the vehicle 100 from tilting when certain conditions are met (such as vehicle speed within set range, brake is pressed). However, a mechanical override is necessary to ensure the vehicle 100 remains locked from tilting when the park lock lever 308 is latched closed (engaged with the park lock). It is further necessary to ensure that in case of failure of electrical system or control system, the park lock shutoff valve 607 does not end up in an open state. This is to avoid unintended locking of tilting angle when vehicle 100 is in operation. Otherwise a rider may lose control of the vehicle 100. To prevent the park lock shutoff valve 607 from going to its open state, a mechanical return spring (a mechanical restoring element) 609 is installed that biases the park lock shutoff valve 607 to its open state. And the mechanical return spring 609 keeps the park lock shutoff valve 607 open until the park lock shutoff valve 607 is closed by the park lock lever 308. The purpose is to lock the vehicle 100 from tilting when the vehicle 100 is in parking and to keep the vehicle 100 unlocked when the vehicle 100 is in motion.

As shown in FIG. 13, when the park lock is engaged with the park lock lever 308, the park lock shutoff valve 607 prevents hydraulic fluid from passing to the rest of the circuit, thereby inhibiting tilting. The rest of the circuit includes every element downstream the park lock shutoff valve 607, mainly including the tilt-controlled shuttle valve 626. The orientation of the vehicle 100 at the time the park lock is engaged will be maintained. This feature allows the vehicle 100 to be parked vertically upright, even on an inclined surface.

Park lock overload check valves 610 and 611 are installed and set to relieve hydraulic overpressure in the hydraulic circuit 600 to prevent damage. Such overpressure may occur if the vehicle 100 is pushed with a sufficiently high side force when the park lock is engaged with the park lock lever 308. With the aid of this feature, if another vehicle or object pushes on the parked vehicle 100, instead of falling over, the parked vehicle 100 is able to tilt out of the way and limit its damage.

The mechanism that the park lock overload check valves 610 and 611 relieving the hydraulic overpressure is described herein. When the hydraulic pressure acting on the park lock overload check valves 610 and 611's check balls from the hydraulic side, it creates a higher hydraulic force than a counter spring force of the park lock overload check valves 610 and 611, the park lock overload check valves 610 and 611 open and bleed off hydraulic fluid, e.g., from the tilt pistons 601 and 602, until the overpressure is relieved and the hydraulic force becomes lesser than the counter spring force.

Another function that the electric actuation of the park lock shutoff valve 607 permits is steering angle and speed-dependent tilt limiting. The vehicle 100's ECU is able to calculate the maximum safe lean angle from steering and speed signals. It then commands the park lock shutoff valve 607 to close when that tilt limit is reached, preventing the vehicle 100 to overlean. If the park lock shutoff valve 607 locks, further leaning is not allowed. In some embodiments, the vehicle 100's ECU instantly establishes what the vehicle 100's lean envelope should be, i.e., how much lean could be instantly necessary, using inputs including the vehicle 100's speed, steering angle, or some other factors. An instant maximal tilting angle may thus be calculated as a result.

In an overlean condition the rider must apply a correction to the vehicle 100 to keep it upright and if he does not succeed, the vehicle 100 can topple. Limiting the permitted lean angle helps the rider to control the vehicle 100. If a bump is encountered by the rear suspension module 202 in the tilt limiting condition, the park lock overload check valves 610 and 611 will allow a certain amount of suspension motion by bleeding off fluid, i.e., to allow further rotation displacement of the rear swingarm assembly 306. This action is a secondary measure, because the park lock shutoff valve 607 is instantly opened by the control system, e.g. the ECU, when the suspension has to be allowed freedom to move, e.g., when the control system is aware of a bump condition detected by a relative pressure measurement between the tilt pistons 601 and 602. In another embodiment, recirculation valves can be added to the hydraulic circuit 600 to allow unimpeded suspension motion in the returning direction. Thus an increase in tilt angle is prohibited, but a decrease is allowed by the recirculation valve.

Damping orifice valves 612 and 613 are installed to control damping of the rotational motion of the rear suspension assembly. In some embodiments, the damping orifice valves 612 and 613 are installed between the tilt cylinders and the accumulator 506 and the collector 507. These valves are similar in construction to those used in vehicle suspension dampers. The valve's orifices and deformable shim stacks are used to provide the desired damping curves during slow and fast movements of the suspension, e.g. providing a damping force that resists movement in proportion to the square of the velocity of the moving part. Fast movement is generated by hitting a bump with one of the rear wheels, while slow movements arise from the tilting motion of the vehicle 100's body during cornering. Dampers add a speed-dependent momentum resisting tilting, and add damping control without which the rear suspension could oscillate after hitting a bump. Such condition would reduce the tractive force the rear wheels can generate (both in the lateral and longitudinal directions, that are necessary for cornering and braking/acceleration, respectively), leading to momentary loss of control of the rear suspension.

For very aggressive (very high speed) single wheel bumps, the park lock overload check valves 610 and 611 open and allow the system pressure to be relieved. By doing so, bump disturbance fed into the vehicle 100's chassis is reduced, maintaining rider comfort and vehicle stability.

The vehicle 100's maximum tilt angle can also be set by the internal travel stops of tilt pistons 601 and 602. The travel stop may be a direct contact between the piston shaft and the piston housing, or may include a spring element to cushion the impact.

If a hydraulic piston moves suddenly in the extension direction, it can drop the pressure in the hydraulic fluid to a point where a vacuum bubble forms, a process called cavitation. Cavitation damages the system as it creates gradual metal erosion. To prevent it from occurring, there are spring loaded check valves 614 and 615 installed and set such that they remain closed during normal operation, but open when system pressure drops to atmospheric level. The normal operation indicates that the pistons are moving at low to moderate speeds, and no big bump is hit by a single rear wheel (i.e. one-wheel bump). If the spring loaded check valves 614 and 615 are opened, they connect the hydraulic system (i.e. hydraulic circuit 600) to the reservoir 508 which is at atmosphere pressure, and then the pressure of the hydraulic system equalizes (i.e., balances) to prevent cavitation, i.e. releasing the bubble via the reservoir 508. Another measure in place to prevent cavitation is returning (i.e. releasing) fluid from the collector 507 into the main pressure line through the return check valve 616. This will occur any time the pressure of the collector 507 is higher than the tilt pistons 601 and 602's hydraulic-flow-line pressure.

The load reaction pistons 303 are connected to the pressure compensator valve 604 through a load reaction shutoff valve 617 and a two-pressure valve 618, and so are the leveling valve 402 and the actuator 403. The load reaction shutoff valve 617 is mechanically connected to the park lock lever 308, and only allows hydraulic fluid to pass when the park lock is engaged by the park lock lever 308, e.g., when the vehicle 100 is in motion. This is necessary so that while driving, dynamic load variations created by road surface gradients are not allowed to constantly adjust system behavior. Adjustment at this time could upset vehicle 100's balance and confuse the rider. To ensure that the system remains in a safe condition, a returning spring (returning element) 619 is added to bias the load reaction shutoff valve 617 to a closed state.

When there is no payload on the cargo bed 203, the pressures at ports TPa and TPb are zero, and the two-pressure valve 618 is closed. Note that the pressure being zero means the gauge pressure (above atmospheric). As load is added, the two-pressure valve 618 opens to connect ports TPa and TPc. If the pressure from the collector 507 at TPa exceeds the load reaction pressure at TPb, the two-pressure valve 618 connects ports TPa and TPc.

When the pressure at port TPc is lower than system pressure at a node VPx, the pressure compensator valve 604 is closed. This is the condition with no cargo loading. The fluid being pumped by the tilt pistons 601 and 602 enters the hydraulic chamber of the accumulator 506 and the system pressure increases. Once the system pressure rises above the pressure at a node VPy, plus an internal nominal pressure set by an internal spring of the pressure compensator valve 604, the pressure compensator valve 604 opens and fluid is vented into the collector 507. As the collector 507's pressure increases, so does the node VPy, and then a pressure regulation setpoint of the pressure compensator valve 604 is moved higher in proportion to the pressure at the node VPy. This action results in a proportionally increasing pressure at the tilt pistons 601 and 602. The pressure regulation setpoint is a value that the pressure compensator valve 604 is operating at. In some embodiments, a constant or variable pressure source is used to set the pressure regulation setpoint of the pressure compensator valve 604.

When there is cargo payload added, the pressure at the node VPy will be higher, causing the pressure compensator valve 604 to remain closed until the load reaction pressure equals the system pressure at the node VPx plus a nominal pressure of the pressure compensator valve 604. At that point the pressure compensator valve 604 is opened and diverts hydraulic fluid into the collector 507. When the collector 507's pressure increases past the load reaction pressure, it begins to increase the regulation setpoint as described above. The higher pressure in the hydraulic circuit 600 translates into proportionally greater returning torque (i.e. reverse torque) being applied to the input shaft 503 with greater cargo loading. The input shaft 503 has actuating arms that the tilt pistons 601 and 602 act on, thereby creating the returning torque. As load is added to the vehicle 100, the center of gravity moves higher and further from the axis of vehicle rotation. Combined with the weight of the cargo, the load increases the overturning momentum that attempts to make the vehicle 100 fall over. The increase in returning momentum achieved by the present disclosure counteracts this momentum in proportion to the cargo load.

It should be noted that in a situation where intended cargo loading of an application of the vehicle 100 will not be comparatively high, the collector 507, the two-pressure valve 618, the return check valve 616 and the pressure compensator valve 604 may be optional to the hydraulic circuit 600 shown in FIGS. 10-13. The hydraulic circuit 600 then operates in the same manner as described herein but independently of the vehicle 100's cargo load.

Hydraulic Pump System

The disclosure described thus far is a passive system, where the pressure in the system is created by the movement of the vehicle 100. Some performance and control advantages can be imparted by using a hydraulic pump to supply system pressure.

Adjustable Rear Air Suspension

The rear suspension module's load leveling function can be accomplished by using a variable air suspension as well. Such system would replace the damper 304, such as a hydro-mechanical spring/damper unit, and the adjustable rear suspension rocker assembly 305, with an air bladder and a pneumatic pump that can increase pressure within the air bladder in response to increased cargo loading.

Electro-Hydraulic Version

As an evolutionary embodiment of this hydraulic tilt control system, electronic control can be added to create increased control fidelity and intelligence. This system would allow the use of electric loadcells instead of load reaction pistons, and control the valves of the system by electronic solenoids. This system can be used in combination with a hydraulic pressure pump, or with the passive accumulator-based system. System pressure can be set by a pressure control solenoid to any pressure curve desired, and can be a function of tilt angle, tilt angle rate of change and vehicle speed.

For the control of this system, the generated returning momentum can be linked to cornering conditions through the use of an accelerometer and/or yaw sensor and/or gyroscope, which can measure the forces acting on the vehicle 100 with respect to the direction of the force of gravity to confirm a tilt angle of the vehicle 100. The system can be configured in a way to create vehicle centering at any tilt angle, and aid in the stability of the vehicle 100.

The addition of steering angle and/or torque inputs to the system can further enhance the amount of assist it can provide the rider. The expense and complexity of a fully active system is eliminated by allowing the system to be mostly reactive. However, rider intent can be deduced from sensor inputs, and the returning momentum can be set to even higher levels such that the system can aid in the movement of the vehicle 100. This system can counteract the increased inertia of the loaded vehicle 100, and reduce the difference in vehicle dynamic behavior between fully loaded and unloaded states.

From the foregoing, it will be appreciated that specific embodiments have been described herein for purposes of illustration, but that various modifications may be made without deviating from the spirit and scope of the present technology. Moreover, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the present technology.

The invention claimed is:

1. A suspension system installed on a vehicle, comprising:
   a rear suspension mounting structure;
   a rear suspension swing arm, pivotally coupled to the rear suspension mounting structure and configured to rotate about the rear suspension mounting structure in response to a tilting movement of the vehicle;
   a tilt limiting structure, configured to inhibit the tilting movement when a tilt angle of the vehicle exceeds an instantly-calculated tilt angle value; and
   a tilt restoring structure, configured to apply a force in response to the tilting movement,
   wherein the tilt restoring structure comprises:
   at least one rod, pivotally bolted to the rear suspension mounting structure;
   a rocker assembly, coupled to the rear suspension swing arm and pivotally coupled to the at least one rod; and
   a damper, coupled to the rocker assembly and a chassis of the vehicle, wherein the rocker assembly compresses the damper by causing the at least one rod to drive the rocker assembly upward in response to the tilting movement of the vehicle,
   wherein the compressed damper decompresses and generates a counter force to offset the tilting movement.

2. The suspension system of claim 1, further comprising:
   an actuator, coupled to the rocker assembly for adjusting a relative position between the rocker assembly and a rocker pivot axis member on the rear suspension swing arm and for adjusting a motion ratio of the vehicle;
   a leveling valve, coupled to the actuator and configured to be used to activate or deactivate the actuator; and
   a park lock lever, using the leveling valve, to activate the actuator when the vehicle is in motion and to deactivate the actuator when the vehicle is not in motion;
   wherein the compressed damper decompresses and generates the counter force to offset a rotation momentum of the rear suspension swing arm caused by the rocker assembly when the vehicle is not in motion and when the park lock lever is disengaged from a park lock of the vehicle.

3. The suspension system of claim 2, further comprising:
an input shaft, coupled to the rear suspension mounting structure and configured to rotate in response to a change of load of the vehicle or the tilting movement, wherein the input shaft transmits a rotation force to the rear suspension mounting structure; and
at least one load reaction element coupled to the actuator and configured to respond to the change of the load of the vehicle,
wherein the actuator's position is adjusted by the at least one load reaction element when the load of the vehicle changes,
wherein a change of the counter force from the damper is generated in response to adjusting the actuator position.

4. The suspension system of claim 3, further comprising:
a hydraulic system, comprising:
at least two tilt pistons, disposed on opposite sides of the vehicle and coupled to each other and to the input shaft, and the at least two tilt pistons are configured to generate a hydraulic fluid pressure in response to a rotation of the input shaft;
a park lock shutoff valve, coupled to the park lock lever and the at least two tilt pistons, and the park lock shutoff valve is configured to inhibit an adjustment of the hydraulic fluid pressure depending on an engagement status of the park lock of the vehicle with the park lock lever;
a mechanical restoring element, coupled to the park lock shutoff valve and configured to generate a restoring force to open the park lock shutoff valve; and
at least two hydraulic accumulators, coupled to the at least two tilt pistons for balancing the hydraulic fluid pressure,
wherein a shutoff force greater than the restoring force is generated by the park lock lever to close the park lock shutoff valve when the vehicle is not in motion,
wherein the input shaft comprises at least one actuating arm, and the at least one actuating arm is coupled to the rear suspension mounting structure and configured to generate a reverse torque in response to the adjustment of the hydraulic fluid pressure.

5. The suspension system of claim 4, wherein the hydraulic system further comprises:
a shuttle valve, configured to direct a hydraulic fluid to a working chamber of one of the at least two tilt pistons and to vent the hydraulic fluid from a non-working chamber of the one of the at least two tilt pistons to a hydraulic reservoir.

6. The suspension system of claim 4, wherein the hydraulic system further comprises:
at least one park lock overhead check valve, coupled to the at least two tilt pistons, and the park lock overhead check valve opens when the hydraulic fluid pressure exceeds a damping force, thereby releasing the hydraulic fluid pressure from at least one of the two tilt pistons wherein the damping force is generated by an internal spring of at least one of the two tilt pistons to close the park lock overhead check valve.

7. The suspension system of claim 4, wherein the park lock shutoff valve is further configured to be closed for a predetermined duration to inhibit the adjustment of the hydraulic fluid pressure when the vehicle is in motion and when the tilt angle of the vehicle exceeds the instantly-calculated tilt angle value,
wherein after the predetermined duration lapses, the park lock shutoff valve opens to allow the adjustment of the hydraulic fluid pressure.

8. The suspension system of claim 4, wherein the hydraulic system further comprises:
at least one damping orifice valve, coupled to the at least two tilt pistons and the at least two hydraulic accumulators, and configured to generate a speed-dependent hydraulic damping pressure.

9. The suspension system of claim 4, wherein the hydraulic system further comprises:
a hydraulic reservoir; and
at least one spring loaded check valve, coupled to the hydraulic reservoir, wherein the at least one spring loaded check valve is configured to release bubbles in the hydraulic reservoir when the vehicle is in motion or when the tilting movement of the vehicle occurs.

10. The suspension system of claim 4, wherein the hydraulic system further comprises:
a return check valve, coupled to the at least two hydraulic accumulators and configured to release the hydraulic fluid from one of the at least two hydraulic accumulators to a main fluid circuit.

11. The suspension system of claim 4, wherein the hydraulic system further comprises:
a load reaction shutoff valve, coupled to the park lock lever and the at least one load reaction element, and the load reaction shutoff valve is configured to allow fluid passage when the park lock lever is engaged with the park lock of the vehicle and the vehicle is in motion;
a returning element, coupled to the load reaction shutoff valve and configured to generate a returning force to close the load reaction shutoff valve;
a two-pressure valve, coupled to the load reaction shutoff valve and configured to open when the load of the vehicle is increased; and
a pressure compensator valve, coupled to one of the at least two hydraulic accumulators and the two-pressure valve, and the pressure compensator valve is configured to direct the hydraulic fluid into and out from the one of the at least two hydraulic accumulators.

12. The suspension system of claim 11, wherein the pressure compensator valve is further configured to direct the hydraulic fluid into the at least two hydraulic accumulators when the vehicle is in motion or when the tilting movement of the vehicle occurs.

13. The suspension system of claim 4, wherein the at least two tilt pistons comprise at least one of a single vane rotary pump, a multiple vane rotary pump, a gear pump, and a double-acting hydraulic cylinder.

14. The suspension system of claim 4, wherein valve activities of the hydraulic system are controlled by an electronic solenoid.

15. The suspension system of claim 1, wherein a tilt angle of the vehicle is measured using at least one of an accelerometer, a yaw sensor and a gyroscope.

* * * * *

UNITED STATES PATENT AND TRADEMARK OFFICE
CERTIFICATE OF CORRECTION

Page 1 of 1

PATENT NO. : 10,507,882 B2
APPLICATION NO. : 15/748188
DATED : December 17, 2019
INVENTOR(S) : Yi-Pin Wei and Christian Jansen It is certified that error appears in the above-identified patent and that said Letters Patent is hereby corrected as shown below:

On the Title Page

Item (72),
The second named inventor's name is mis-spelled as "CHRISTIAN JANSE". The correct spelling should be "CHRISTIAN JANSEN".

Signed and Sealed this
Fourteenth Day of January, 2020

Andrei Iancu
*Director of the United States Patent and Trademark Office*